(12) United States Patent
Shibata et al.

(10) Patent No.: US 10,789,454 B2
(45) Date of Patent: Sep. 29, 2020

(54) IMAGE PROCESSING DEVICE, IMAGE PROCESSING METHOD, AND COMPUTER PROGRAM PRODUCT

(71) Applicant: Kabushiki Kaisha Toshiba, Minato-ku, Tokyo (JP)

(72) Inventors: Tomoyuki Shibata, Kawasaki Kanagawa (JP); Yuto Yamaji, Kawasaki Kanagawa (JP); Daisuke Kobayashi, Kunitachi Tokyo (JP)

(73) Assignee: Kabushiki Kaisha Toshiba, Tokyo (JP)

(*) Notice: Subject to any disclaimer, the term of this patent is extended or adjusted under 35 U.S.C. 154(b) by 111 days.

(21) Appl. No.: 16/122,738

(22) Filed: Sep. 5, 2018

(65) Prior Publication Data

US 2019/0188456 A1 Jun. 20, 2019

(30) Foreign Application Priority Data

Dec. 18, 2017 (JP) ................................. 2017-242130

(51) Int. Cl.
*G06K 9/00* (2006.01)
*G06K 9/62* (2006.01)

(52) U.S. Cl.
CPC ..... *G06K 9/00281* (2013.01); *G06K 9/00275* (2013.01); *G06K 9/6211* (2013.01);
(Continued)

(58) Field of Classification Search
CPC ........... G06K 9/00281; G06K 9/00275; G06K 9/6211; G06K 9/00369; G06K 2009/00328
(Continued)

(56) References Cited

U.S. PATENT DOCUMENTS 8,249,310 B2* 8/2012 Okubo ............... G06K 9/00248
345/615
9,251,402 B2* 2/2016 Sun ..................... G06K 9/00281
(Continued)

FOREIGN PATENT DOCUMENTS

JP 5649601 B2 1/2015
JP 6040825 B2 12/2016

OTHER PUBLICATIONS

Navneet Dalal, et al. "Histograms of Oriented Gradients for Human Detection", CVPR, vol. 1, 2005.
(Continued)

*Primary Examiner* — Marceau Milord
(74) *Attorney, Agent, or Firm* — Knobbe, Martens, Olson & Bear, LLP

(57) ABSTRACT

An image processing device includes one or more processors. The processors detects two or more first partial areas corresponding to each of two or more portions among a plurality of portions that are included in an object and that are set in advance from a first image, and detect two or more second partial areas corresponding to each of two or more portions among the portions from a second image. The processors extracts two or more first feature vectors from two or more of the first partial areas, and extract two or more second feature vectors from two or more of the second partial areas. The processors determines whether an object included in the first image and an object included in the second image are same, by using the first feature vectors and the second feature vectors.

9 Claims, 13 Drawing Sheets

(52) U.S. Cl.
CPC .................. *G06K 9/00369* (2013.01); *G06K 2009/00328* (2013.01)

(58) Field of Classification Search
USPC ................................. 382/118, 103, 296, 186
See application file for complete search history.

(56) References Cited

U.S. PATENT DOCUMENTS

| | | | |
|---|---|---|---|
| 9,471,830 | B2 | 10/2016 | Kawahara et al. |
| 2009/0092336 | A1* | 4/2009 | Tsurumi ............... G06K 9/3216 382/294 |
| 2015/0055836 | A1* | 2/2015 | Moteki ............. G06K 9/00355 382/124 |
| 2015/0317037 | A1* | 11/2015 | Suzuki ................. G06F 3/0426 345/175 |
| 2016/0140762 | A1* | 5/2016 | Niinuma ................. G06F 1/163 345/633 |
| 2016/0154995 | A1* | 6/2016 | Magai ................. G06T 7/0002 382/195 |
| 2016/0171340 | A1* | 6/2016 | Fleishman ......... G06K 9/00375 382/159 |
| 2016/0253581 | A1* | 9/2016 | Takahashi .......... G06K 9/00362 382/165 |
| 2017/0011496 | A1* | 1/2017 | Lu .......................... G06T 15/50 |
| 2017/0083791 | A1* | 3/2017 | Shiratani ............. G06K 9/00624 |
| 2017/0206441 | A1* | 7/2017 | Miyano .................... H04N 7/18 |
| 2017/0286801 | A1* | 10/2017 | Rampal ................ G06K 9/6209 |
| 2018/0098689 | A1* | 4/2018 | On ..................... A61B 1/00032 |
| 2018/0144466 | A1* | 5/2018 | Hsieh ..................... G06F 19/00 |
| 2018/0300885 | A1* | 10/2018 | On ............................ G06T 7/74 |
| 2019/0114773 | A1* | 4/2019 | Song ........................ G06T 7/10 |
| 2019/0392249 | A1* | 12/2019 | Yamada ............... G06K 9/4647 |

OTHER PUBLICATIONS

Pedro F. Felzenszwalb, et al. "Object Detection with Discriminatively Trained Part Based Models", PAMI, vol. 32, Issue 9, 2010.
He Kaiming, et al. "Deep Residual Learning for Image Recognition", arXiv:1512.03385v1, 2015.
Ren, Shaoqing, et al. "Faster R-CNN: Towards Real-Time Object Detection with Region Proposal Networks", Advances in neural information processing systems, 2015.

* cited by examiner

FIG.7
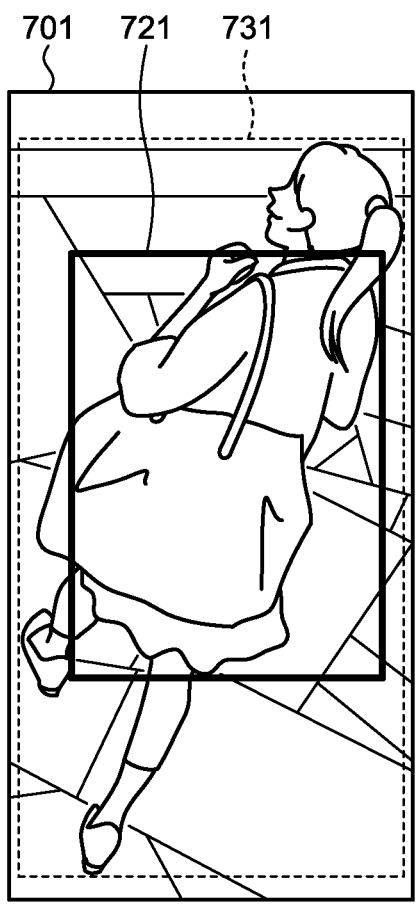
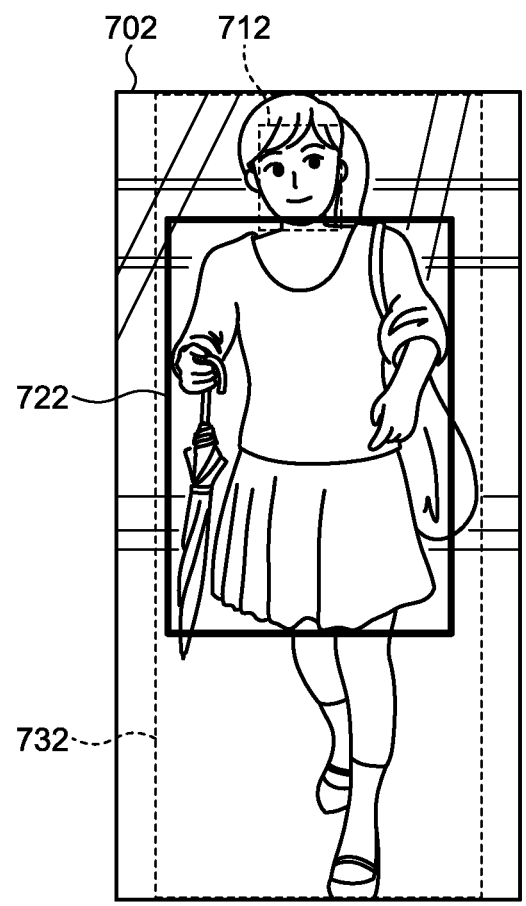

IMAGE PROCESSING DEVICE, IMAGE PROCESSING METHOD, AND COMPUTER PROGRAM PRODUCT

CROSS-REFERENCE TO RELATED APPLICATIONS

This application is based upon and claims the benefit of priority from Japanese Patent Application No. 2017-242130, filed on Dec. 18, 2017; the entire contents of which are incorporated herein by reference.

FIELD

Embodiments described herein relate generally to an image processing device, an image processing method, and a computer program product.

BACKGROUND

Conventionally, as a method for determining whether a person in a stored image and a person in another image are the same, a method has been known for detecting a specific area set in advance such as a face and a whole body, and using the similarity between images that is calculated based on a feature vector obtained from the area. A collation device is also known that uses information on a name plate such as a staff identity card in addition to face authentication using a face area for improving the determination performance. In a tracking process for associating a specific object in a video image among frames, a technique is also known for detecting a plurality of areas of the object and allowing the tracking of the specific object even if a part of the areas is hard to detect, based on the positional relation between the areas.

However, in the conventional techniques, for example, there are cases where determination cannot be made because a target area cannot be detected due to the posture of the object and the positional relation between the object and the camera. Moreover, there are cases where the technique of the tracking process as described above cannot be applied when it cannot assume that images are temporally close to each other. In this manner, with the conventional techniques, there are cases where it is not possible to accurately determine whether objects in images are the same.

BRIEF DESCRIPTION OF THE DRAWINGS

FIG. 7 is a diagram illustrating an example of an output method of a determination result;

DETAILED DESCRIPTION

According to one embodiment, an image processing device includes one or more processors. The processors detects two or more first partial areas corresponding to each of two or more portions among a plurality of portions that are included in an object and that are set in advance from a first image, and detect two or more second partial areas corresponding to each of two or more portions among the portions from a second image. The processors extracts two or more first feature vectors from two or more of the first partial areas, and extract two or more second feature vectors from two or more of the second partial areas. The processors determines whether an object included in the first image and an object included in the second image are same, by using the first feature vectors and the second feature vectors.

Hereinafter, preferred embodiments of an image processing device according to this invention will be described in detail with reference to the accompanying drawings.

For example, an image processing device of the following embodiment is applicable to a person search system for specifying the time when a specific person is appearing from a video image picked up by a monitor camera. In this case, for example, the image processing device determines whether a person in an image registered in advance and a person such as a pedestrian in the monitor camera are the same. Consequently, it is possible to analyze which section in the video image the registered person is appearing. Moreover, the image processing device of the embodiment is applicable to a system for detecting a specific person from a sport video, and a system for tracking a specific object in a video image. The applicable system is however not limited thereto. Moreover, an object to be determined is not limited to a person, and may be any object.

First Embodiment

An image processing device according to a first embodiment detects two or more areas corresponding to a plurality of portions (specific portions) that are included in an object and that are set in advance, from two images used for determining whether objects are the same. The image processing device determines whether objects are the same, by extracting a feature vector for determining whether the objects are the same from each of the detected areas, and using the feature vectors of the areas that are commonly extracted from the two images. Consequently, even if a feature vector cannot be extracted from a part of the areas, it is possible to more accurately determine the similarity of the objects in the images. Because the feature vectors from a plurality of the areas can be used, it is possible to make a determination from a plurality of viewpoints, and further increase the determination accuracy. Moreover, there is no need to assume that the two images are temporally close to each other.

Figure 1:
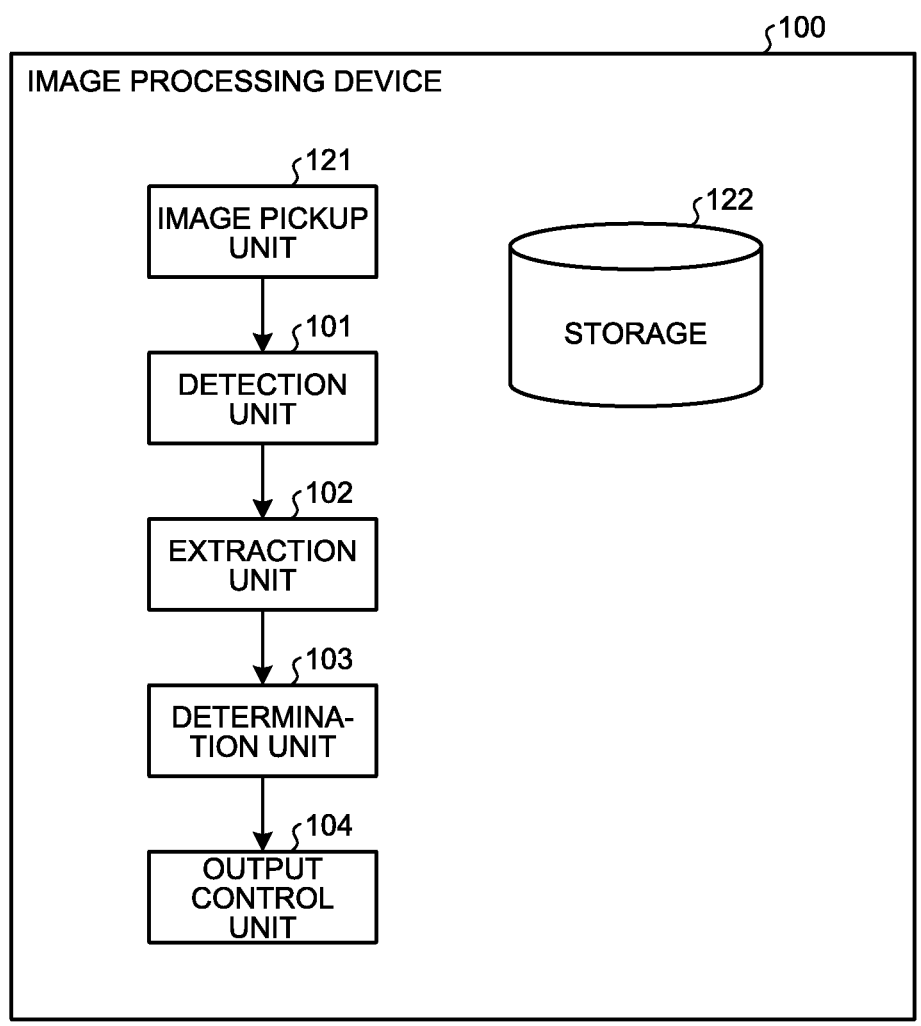
FIG. 1 is a block diagram of an image processing device according to a first embodiment.

FIG. 1 is a block diagram illustrating an example of a configuration of an image processing device 100 according to the first embodiment. As illustrated in FIG. 1, the image processing device 100 includes an image pickup unit 121, storage 122, a detection unit 101, an extraction unit 102, a determination unit 103, and an output control unit 104.

The image pickup unit 121 picks up an image of an object, and outputs the image of the object. For example, the image pickup unit 121 can be implemented by an image pickup device such as a camera. For example, when an image is obtained from a storage medium such as the storage 122 or from the other device, the image processing device 100 need not include the image pickup unit 121.

The storage 122 stores therein various types of information used in various processes performed by the image processing device 100. For example, the storage 122 stores therein an image of a specific object (specific person) obtained in advance, a processing result obtained by each unit, and the like. The storage 122 can be formed of any generally-used storage medium such as a hard disk drive (HDD), an optical disc, a memory card, and a random access memory (RAM).

The detection unit 101 detects a partial area corresponding to a specific portion of an object from an image. For example, the detection unit 101 detects two or more partial areas corresponding to each of two or more portions among a plurality of portions (specific portions) that are included in an object and that are set in advance, from each of two images (first image and second image). For example, two or more partial areas (first partial areas) are detected from the first image, and two or more partial areas (second partial areas) are detected from the second image. The partial areas detected from the two images may be matched or may not be matched.

When the object is a person, for example, the partial area may be the face, head, whole body, upper half body, lower half body, torso, arm, leg, foot, and the like. For example, the partial area is represented by a rectangle including a target. However, the shape of the area is not limited to a rectangle but may also be a circle or an oval.

The two images (first image and second image) to be compared may be any image. For example, when the image processing device 100 is applied to a person search system, an image of a specific person picked up in advance may be set as the first image, and an image in a video picked up by a monitor camera afterwards may be set as the second image. When the image processing device 100 is applied to a system for detecting a specific person from a sport video, an image of a specific person picked up in advance may be set as the first image, and an image in the video may be set as the second image. Two images in the video may also be compared with each other as the first image and the second image. When the image processing device 100 is applied to a system for tracking a specific object, frames near to each other in a video image may be set as the first image and the second image.

A method of detecting a partial area to be performed by the detection unit 101 may be any method. For example, the detection unit 101 may learn an individual detector for extracting each of the partial areas, and use the learned detector. The detection unit 101 may also use a deformable part model in which the robustness with respect to the posture variation is improved by learning the positional relation between the partial areas, as disclosed in P. F. Felzenszwalb, R. B. Girshick, D. McAllester and D. Ramanan, "Object detection with discriminatively trained part based models", PAMI, vol. 32, no. 9, pp. 1627-1645, 2010. The individual detector may also be implemented by a method of learning the foreground and the background using a support vector machine in which luminance gradient is used as the feature (N. Dalal and B. Triggs, "Histograms of oriented gradients for human detection", CVPR, vol. 1, pp. 886-893, 2005).

The detection unit 101 may also use a detection method using deep learning. A known method using deep learning includes Faster Region-based Convolutional Neural Networks (R-CNN) disclosed in Ren, Shaoqing, et al. "Faster R-CNN: Towards real-time object detection with region proposal networks." Advances in neural information processing systems, 2015, or the like. With the Faster R-CNN, the detection unit 101 can commonly extract a feature map being an intermediate representation from an input image, then extract a candidate rectangle corresponding to each partial area from the feature map, and output the result. Consequently, it is possible to learn a plurality of the partial areas at the same time, estimate the similarity at the same time, and output the result.

The extraction unit 102 calculates a feature vector from the partial area detected by the detection unit 101. The extraction unit 102 does not extract a feature vector from the partial area that is prevented from being detected due to the appearance of the target. When the feature vectors are extracted from the plurality of partial areas, the extraction unit 102 may also integrate the feature vectors to output the integrated result.

The extraction unit 102 extracts a feature vector from each of the partial areas detected by the detection unit 101, using a feature extraction method designed according to the partial area. The feature vector to be extracted is a feature vector for determining the same person, and is information for expressing the individuality. Consequently, a feature space in which the same person is similar and the other person is not similar is learned, and used for extracting the feature vector.

In general, the feature extraction method includes feature description and mapping to space obtained by metric learning. The feature description is a process of calculating a numeric vector (feature vector) of a fixed dimension from image information in the partial area, by using a method designed in advance. For example, the extraction unit 102 can use Histogram of Gradients (HOG; N. Dalal and B. Triggs, "Histograms of oriented gradients for human detection", CVPR, vol. 1, pp. 886-893, 2005) that divides a partial area into a plurality of blocks and describes the frequency of luminance gradient of each of the blocks. The extraction unit 102 can also calculate a feature vector in which pixel values are arranged, by resizing the partial area into a fixed size.

The metric learning may be any learning method. For example, a linear discrimination analysis, deep learning, and the like may be used for the metric learning. The deep learning is a method of simultaneously optimizing (learning) the feature extraction and the metric learning so that the recognition performance of learning data becomes maximum (He, Kaiming, et al. "Deep Residual Learning for Image Recognition." arXiv preprint arXiv: 1512.03385 (2015)). When deep learning such as Residual Net is used, the final output of the model learned in advance is a likelihood string of an object used for learning, and information on an unlearned object cannot be obtained. Thus, an intermediate state such as the pool5 layer immediately before the final output layer is extracted and used as the feature vector.

The determination unit 103 determines whether objects included in the two images (first image and second image)

are the same by using the extracted feature vectors. For example, the determination unit 103 uses the feature vector (first feature vector) extracted from the first partial area and the feature vector (second feature vector) extracted from the second partial area for determination.

For example, the determination unit 103 determines whether the objects in the images are the same, by calculating the degree of similarity between the two images, using the feature vector of the partial area (third partial area) from which the feature vector is commonly extracted, and comparing the degree of similarity with the threshold. For example, it is assumed that the feature vectors of the face, the upper half body, and the whole body are extracted from the first image, and the feature vectors of the upper half body and the whole body are extracted from the second image. In this case, the determination unit 103 uses the feature vectors of the upper half body and the whole body that are commonly extracted. Because two or more partial areas are detected from each of the first image and the second image, the number of the third partial area from which the feature vector is commonly extracted from the two images will be one or more.

The determination unit 103 can use two or more feature vectors extracted from each of two or more of the partial areas. Consequently, compared to a conventional technique that only uses a single area, it is possible to greatly reduce probability of not being able to make a determination because a feature vector cannot be extracted.

The degree of similarity between the feature vectors can be calculated using any method. For example, the determination unit 103 can use vector similarity between the feature vectors (feature vectors), or use an inter-vector distance between the feature vectors.

The determination unit 103 may also determine whether the objects in the two images are the same, by calculating the degree of similarity between the corresponding feature vectors for each of two or more feature vectors, and comparing the weighted sum of the calculated two or more degrees of similarity and the like with a threshold. For example, the determination unit 103 calculates the degree of similarity sim (i,j) between objects using the following formula 1.

$$sim(i, j) = \frac{\sum w_p S(i, j, p)}{\sum w_p}, \quad (1)$$

$$S(i, j, p) = \frac{(x_{p,i} | x_{p,j})}{\|x_{p,i}\| \|x_{p,j}\|}$$

In this example, <a|b> represents an inner product of a vector a and a vector b. $x_{p,i}$ is a feature vector of an object i for a partial area p. $x_{p,j}$ is a feature vector of an object j for the partial area p. S (i,j,p) is equivalent to the degree of similarity between the feature vectors for the partial area p. Σ means to calculate the sum of all of the partial areas p.

Weight $w_p$ represents the weight set for the partial area p. With an increase in the value of the weight $w_p$, the degree of similarity between the objects is calculated by taking the degree of similarity of the partial area more into consideration. For example, the weight is set according to reliability in personal authentication of each partial area (reliability in determining whether the objects are the same). For example, when the image processing device of the embodiment is applied to a system for detecting the same person from a sport video, it is assumed that the upper half body area including the uniform is more reliable to specify the individual. Consequently, it is possible to set the weight of the upper half body area to a larger value than that of the other areas. In this manner, the weight of each partial area may be changed according to the type of the system to which the present embodiment is applied, the type of an image (video image) to be processed, and the like.

As the following formula 2, the determination unit 103 may also calculate the degree of similarity between objects from the similarity vector of each partial area p, by defining a vector α using the degree of similarity of the partial area as an element, and by using a regression formula learned in advance using a support vector machine and the like.

$$\alpha = \begin{pmatrix} S(i, j, 1) \\ S(i, j, 2) \\ \vdots \\ S(i, j, p) \end{pmatrix} \quad (2)$$

The determination unit 103 may also determine whether the objects in the images are the same, by comparing each of the calculated two or more degrees of similarity with a threshold set for each portion, and according to the number of degrees of similarity that has exceeded the threshold. In other words, the determination unit 103 may determine whether the objects are the same in each partial area, and determine by majority. For example, the determination unit 103 calculates the degree of similarity sim (i,j) between the objects using the following formula 3. $th_p$ represents a threshold set for the partial area p. P is the number of partial areas used for calculating the degree of similarity. The weight $w_p$ may be all equal.

$$sim(i, j) = \frac{\sum w_p C(i, j, p)}{P \sum w_p}, \quad (3)$$

$$C(i, j, p) = \begin{cases} 1, & S(i, j, p) \geq th_p \\ 0, & S(i, j, p) < th_p \end{cases}$$

The determination unit 103 may also determine whether the objects are the same, by integrating two or more of the feature vectors (feature vectors) into one, generating the feature vector of the object, and depending on the degree of similarity between the integrated feature vectors. For example, the integration of feature vectors can be represented as a subspace by using a subspace method. The determination unit 103 may calculate the feature vector (integrated feature vector) that is the weighted sum of two or more feature vectors as the following formula 4, by setting all the feature vectors to have the same dimensionality d. The weight $w_p$ represents the weight defined for the partial area p as in the formula 1. $x_{p,i,d}$ represents the feature vector of the d dimension of an object i for the partial area p. $M_i$ is a feature vector of the d dimension of the object i.

$$M_i(m_{i,j}, m_{i,2}, \ldots, m_{i,d}), m_{i,d} = \frac{\sum w_p x_{p,i,d}}{\sum w_p} \quad (4)$$

The determination unit 103 determines whether the objects in the two images are the same, by calculating the degrees of similarity of the two integrated feature vectors calculated for each of the two images.

When the integrated feature vector having a common dimensionality is used as in the formula 4, there is no need to limit to the partial area being commonly detected. Consequently, the determination unit 103 may also calculate the integrated feature vector including the feature vector other than the partial area (third partial area) from which the feature vector is commonly extracted from the two images. For example, the determination unit 103 may calculate the integrated feature vector that is obtained by integrating all the feature vectors extracted from the first image, calculate the integrated feature vector that is obtained by integrating all the feature vectors extracted from the second image, and calculate the degree of similarity of the two integrated feature vectors.

For example, similarly to the above, it is assumed that the feature vectors of the face, the upper half body, and the whole body are extracted from the first image, and the feature vectors of the upper half body and the whole body are extracted from the second image. In this case, the determination unit 103 calculates the integrated feature vector obtained by integrating the feature vectors of the face, the upper half body, and the whole body for the first image, calculates the integrated feature vector obtained by integrating the feature vectors of the upper half body and the whole body for the second image, and calculates the degree of similarity between the two integrated feature vectors.

When the calculated degree of similarity is equal to or more than a threshold, the determination unit 103 determines that the objects in the two images are the same. When the degree of similarity is less than the threshold, the determination unit 103 determines that the objects in the two images are different.

The output control unit 104 controls an output process such as a processing result of each process performed by the image processing device 100. For example, the output control unit 104 outputs a determination result of the determination unit 103 (whether objects are the same, the time when the object determined to be the same is appearing, and the like). The output method may be any method. For example, the output control unit 104 outputs a determination result on a display device such as a display. The output control unit 104 may also transmit a determination result to an external device via a network and the like.

Figure 2:
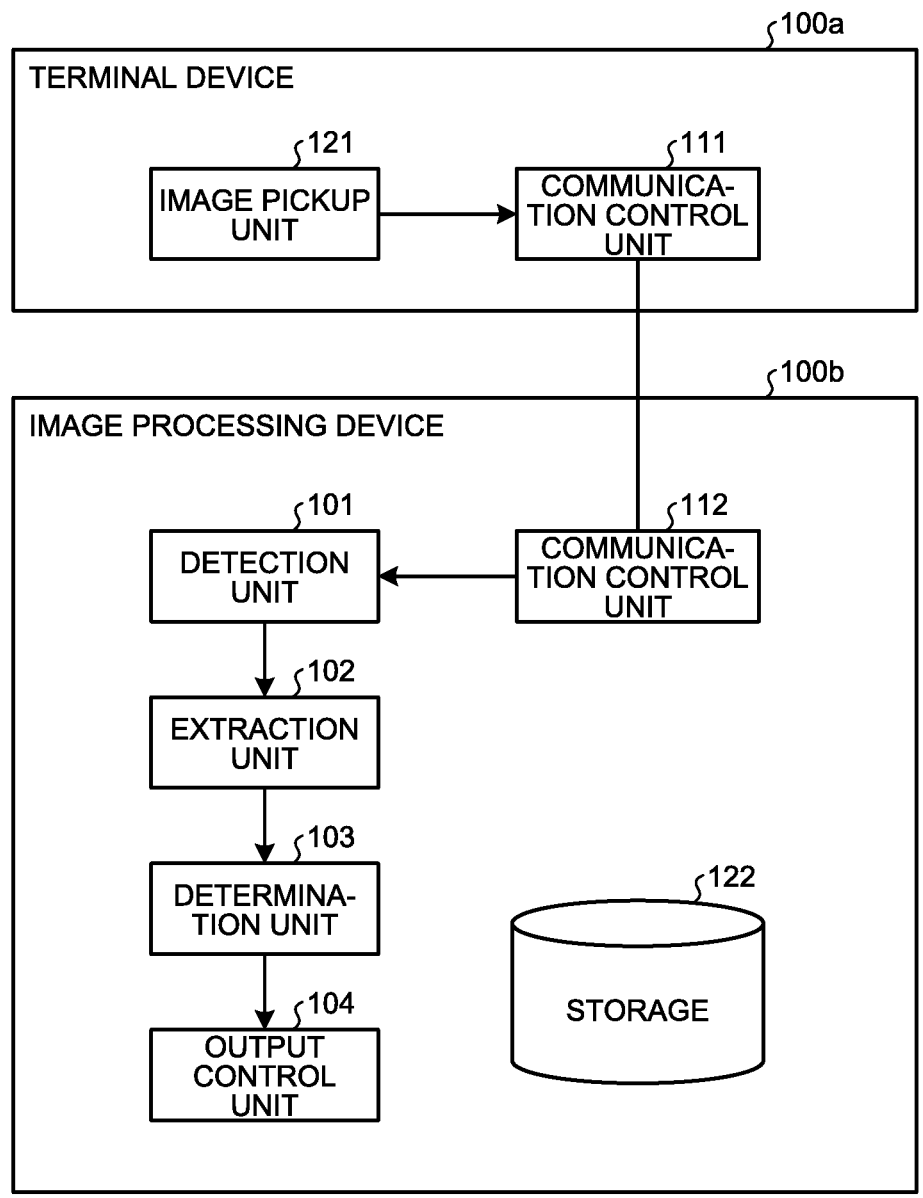
FIG. 2 is a block diagram of an image processing system according to a modification.

Functions of the units in FIG. 1 may also be implemented by a plurality of devices. FIG. 2 is a block diagram illustrating an example of a configuration of an image processing system configured in this manner. The same reference numerals denote the same components as those in FIG. 1, and description thereof will be omitted. Moreover, a configuration in which functions are distributed into a plurality of devices as in FIG. 2 is applicable to the embodiments described below.

As illustrated in FIG. 2, the image processing system includes a terminal device 100a and an image processing device 100b. For example, the terminal device 100a and the image processing device 100b are connected via a network such as the Internet. For example, the terminal device 100a is a monitor camera, a personal computer, a mobile phone, a smartphone, a tablet and the like. For example, the image processing device 100b is a server device built on the cloud.

The terminal device 100a includes the image pickup unit 121 and a communication control unit 111. The image processing device 100b includes a communication control unit 112, the storage 122, the detection unit 101, the extraction unit 102, the determination unit 103, and the output control unit 104.

The communication control unit 111 controls communication with an external device such as the image processing device 100b. For example, the communication control unit 111 transmits an image picked up by the image pickup unit 121 to the image processing device 100b. The communication control unit 111 also receives a processing result (determination result of the determination unit 103 and the like) of the image processing device 100b, from the image processing device 100b.

The communication control unit 112 controls communication with an external device such as the terminal device 100a. For example, the communication control unit 112 receives an image picked by the image pickup unit 121 from the terminal device 100a. The communication control unit 112 also transmits a processing result (determination result of the determination unit 103 and the like) of the image processing device 100b, to the terminal device 100a.

FIG. 2 is an example in which the image pickup unit 121 and the other functional units are divided into two devices. The separation method of the functional units is not limited thereto, and any separation method can be used. For example, the terminal device 100a may include the function up to a process of extracting a feature vector performed by the extraction unit 102 (details will be described later), and the image processing device 100b may execute processes of the determination unit 103 and thereafter. The functions of the units in FIG. 1 may be separated and executed by three or more devices.

For example, the units (detection unit 101, extraction unit 102, determination unit 103, output control unit 104, and communication control units 111 and 112) described above may be implemented by one or more processors. For example, the units described above may also be executed by causing a processor such as a central processing unit (CPU) to execute a computer program, in other words, by software. The units described above may also be implemented by a processor such as a dedicated integrated circuit (IC), in other words, by hardware. The units described above may also be implemented by combining software and hardware. When a plurality of processors are used, each of the processors may implement one of the units, or two or more units.

Figure 3:
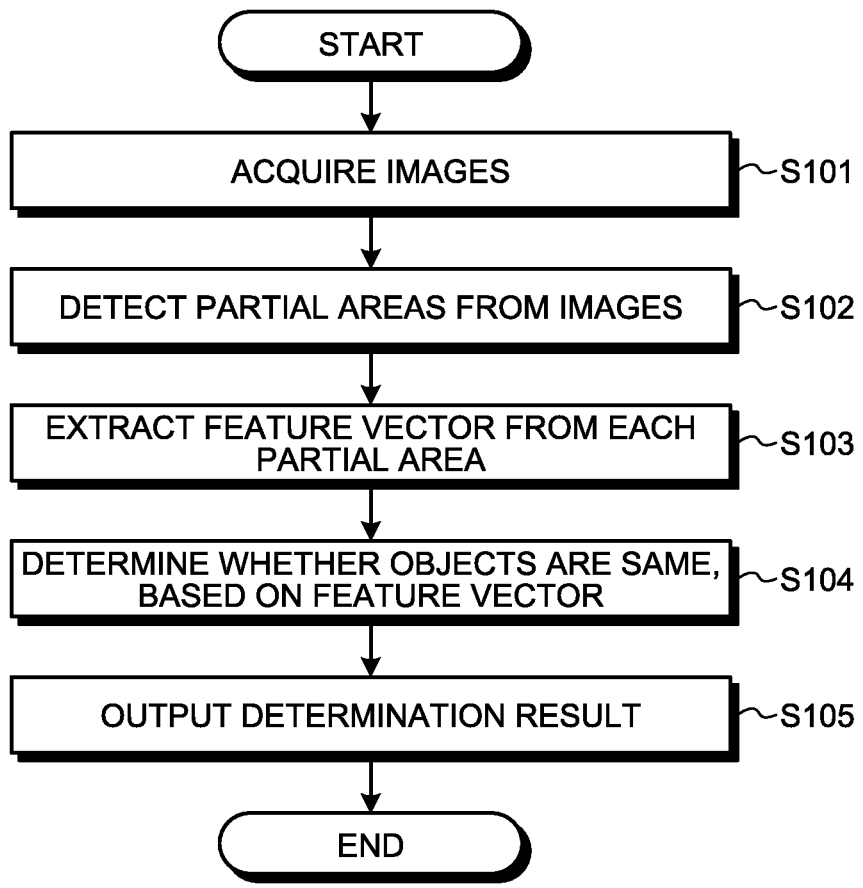
FIG. 3 is a flowchart of a determination process in the first embodiment.

Next, a determination process performed by the image processing device 100 according to the first embodiment configured in this manner will be described with reference to FIG. 3. FIG. 3 is a flowchart illustrating an example of a determination process in the first embodiment.

For example, the detection unit 101 acquires images to be processed from the image pickup unit 121 (step S101). The detection unit 101 detects partial areas corresponding to specific portions of objects from the acquired images (step S102). The extraction unit 102 extracts a feature vector from each of the detected partial areas (step S103). The determination unit 103 determines whether the objects in the two images are the same using the feature vectors (step S104). The output control unit 104 outputs a determination result of the determination unit 103 (step S105).

Figure 4:
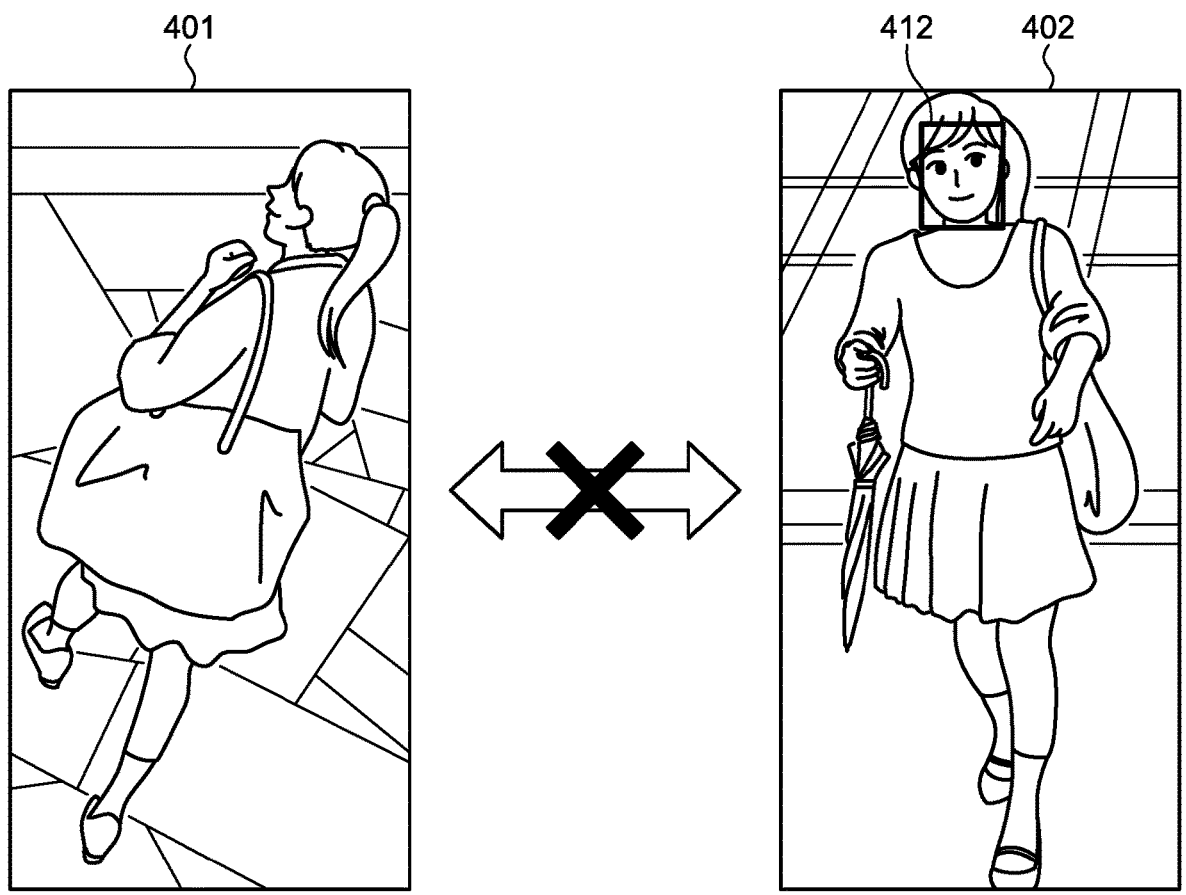
FIG. 4 is a diagram illustrating an example when a single area within an image is used for determining the identity of objects.

Next, a specific example of the determination process will be described. FIG. 4 is a diagram illustrating an example when a single area within an image is used for determining the identity of objects. FIG. 4 illustrates an example when a face area is used for the determination process. As illustrated in FIG. 4, a face area 412 is detected because a face can be recognized in an image 402. However, the face area is not detected in an image 401 because a face cannot be recognized. As a result, it is not possible to determine whether the objects in the two images are the same.

Figure 5:
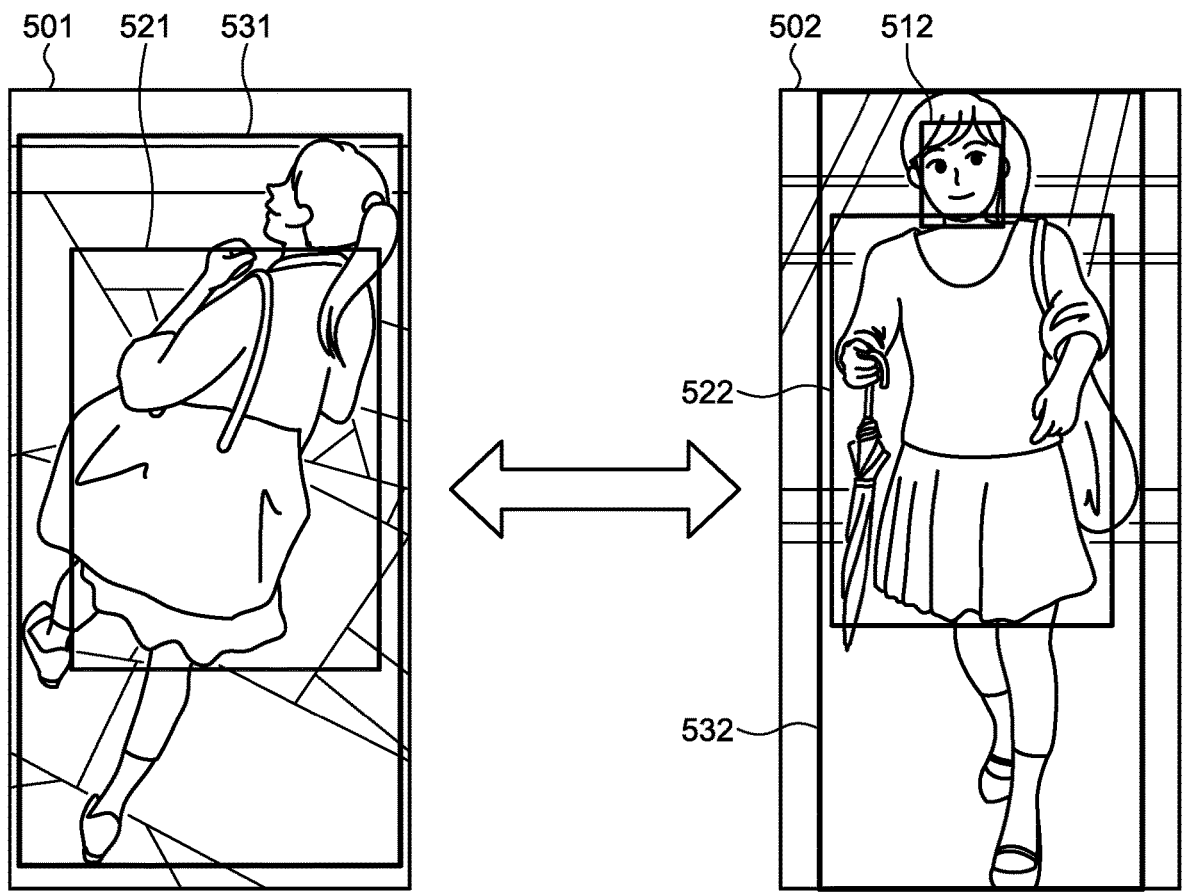
FIG. 5 is a diagram illustrating an example when a plurality of areas within an image are used for determining the identity of objects.
Figure 6:
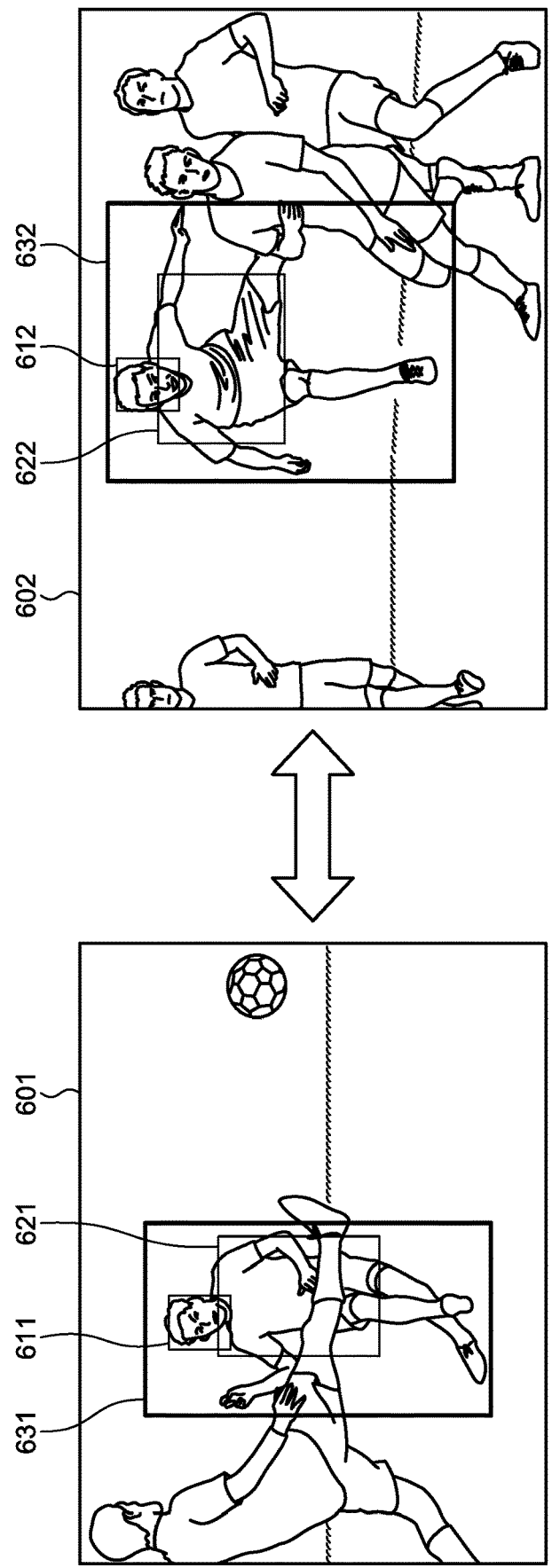
FIG. 6 is a diagram illustrating an example when a plurality of areas within an image are used for determining the identity of objects.

FIG. 5 and FIG. 6 are diagrams each illustrating an example when a plurality of areas within images are used for determining the identity of objects. FIG. 5 and FIG. 6 illustrate examples when the face area, the upper half body area, and the whole body area are used for the determination process. A face area is not detected in an image 501, but an upper half body area 521 and a whole body area 531 are detected. All of a face area 512, an upper half body area 522, and a whole body area 532 are detected in an image 502.

In this case, for example, the determination unit 103 is capable of executing a determination process by using the feature vectors acquired from the upper half body area and the whole body area that are commonly present in both images. When an integrated feature vector is used, the determination unit 103 can use an integrated feature vector obtained by integrating the feature vectors extracted from the two areas of the upper half body area 521 and the whole body area 531 for the image 501, and an integrated feature vector obtained by integrating the feature vectors extracted from three areas of the face area 512, the upper half body area 522, and the whole body area 532 for the image 502.

FIG. 5 is an example when the image processing device of the embodiment is applied to a system for detecting the same person from images obtained from a monitor camera installed in a facility, for example. In such an example, the clothing of a person does not change. Thus, even if the face area cannot be detected, it is possible to highly accurately execute a process of determining whether the persons are the same, by using the upper half body area and the whole body area.

FIG. 6 is an example when the image processing device of the embodiment is applied to a system for detecting the same person from a sport video. In such an example, a face sometimes looks different depending on the change in facial expression and the like. Consequently, it is possible to more accurately execute the determination process by also using the area other than the face area. In the example of FIG. 6, a face area 611, an upper half body area 621, and a whole body area 631 are detected from an image 601, and a face area 612, an upper half body area 622, and a whole body area 632 are detected from an image 602. The determination unit 103 determines whether the persons in the two images are the same, by using the feature vector extracted from each of the three areas.

Figure 8:
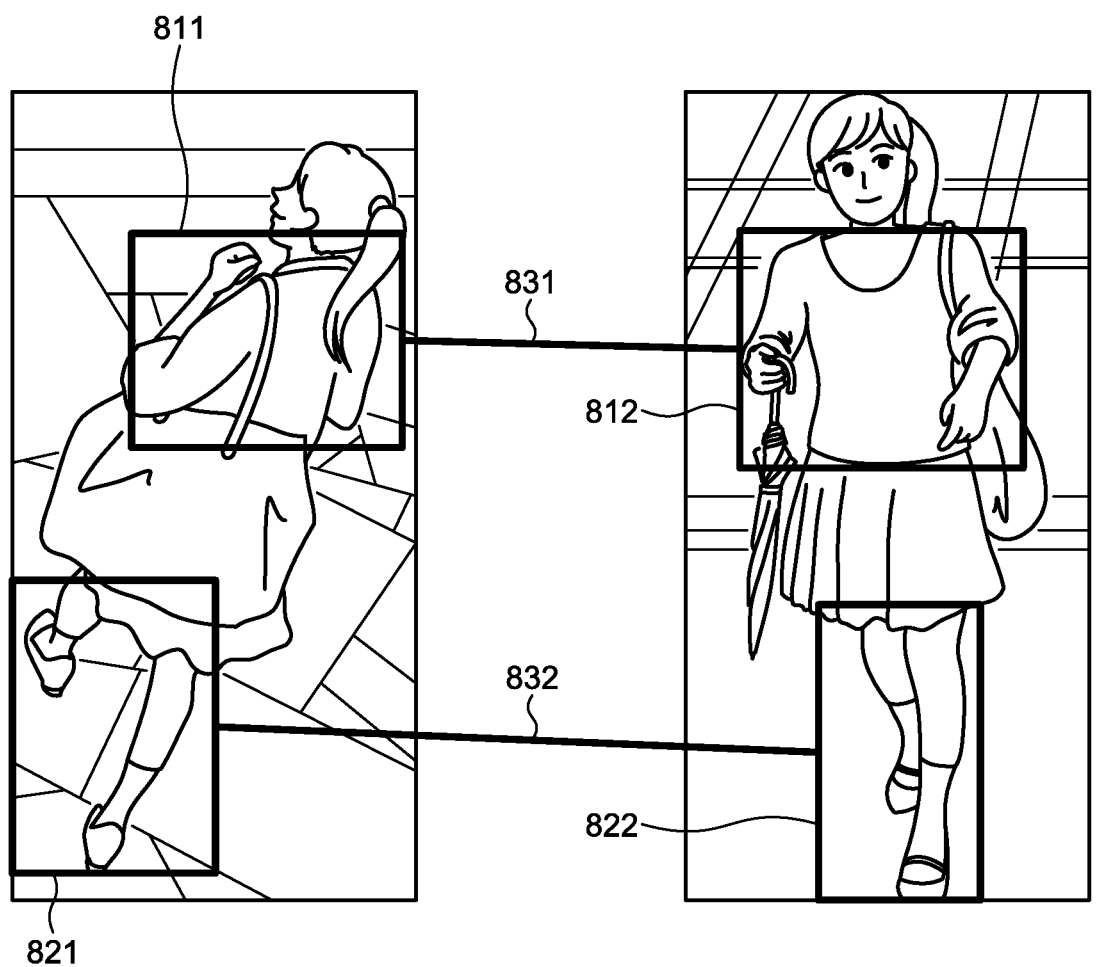
FIG. 8 is a diagram illustrating an example of an output method of a determination result.

FIG. 7 and FIG. 8 are diagrams each illustrating an example of an output method of a determination result. FIG. 7 and FIG. 8 are examples of visualizing and outputting the area on an image that is used for determining whether the objects are the same or different for the user.

For example, the output control unit 104 rearranges the degrees of similarity of the partial areas calculated by the determination unit 103 or the weighted degrees of similarity in a descending order when the objects are determined to be the same, and rearranges the degrees of similarity in an ascending order when the objects are determined to be different. The output control unit 104 then outputs an image in which the partial areas at higher levels within a preset value range are highlighted.

A highlighting method may be any method. For example, a method of changing the thickness of the frame line of the partial area used for determining whether objects are the same, a method of displaying only the partial area with a normal color and reducing the luminance values of the other partial areas, and the like may be applied to the output control unit 104. The display mode (attribute) to be changed is not limited to the above.

FIG. 7 is an example for changing the frame line of a partial area. In FIG. 7, the frame lines of an upper half body area 721 in an image 701 and an upper half body area 722 in an image 702 are displayed with bold lines, and a whole body area 731, a face area 712, and a whole body area 732, which are the other partial areas, are indicated with broken lines.

Moreover, the output control unit 104 may also arrange two images side by side, surround the partial areas with frames, and display the two images by connecting the frames of the same partial areas with a line. Consequently, it is possible to discriminate the partial areas that are determined to be the same. FIG. 8 is a display example in which the partial areas are associated with each other in this manner. In FIG. 8, a line 831 associating a partial area 811 with a partial area 812, and a line 832 associating a partial area 821 with a partial area 822 are displayed.

The output control unit 104 may also prepare black and white object icons, and color the partial areas used for determining whether the objects are the same. In this process, the area with a higher degree of similarity may be colored in a dark color or close to red as the degree of similarity increases, and the area with a lower degree of similarity may be colored in a light color or close to blue as the degree of similarity decreases, as in a heat map.

The image processing device 100 is applicable to a search process and a detection process. For example, the image processing device 100 processes a large number of registered images using the detection unit 101 and the extraction unit 102. The image processing device 100 then stores a flag indicating whether the partial area is detected and the extracted feature vector in an associated manner for each of the detected partial areas, in a registration database such as the storage 122.

To perform the search process, the image processing device 100 inputs an image to be processed and extracts a feature vector of each of the partial areas from the input image by using the detection unit 101 and the extraction unit 102. The image processing device 100 then sets the registration data (registered image) stored in the registration database as a first image, sets the input image as a second image, and determines whether the objects are the same by using the determination unit 103. For example, the output control unit 104 only outputs a registered image with the object determined as the same.

To perform the detection process, the image processing device 100 determines whether objects in the input image to be processed and the registered image are the same, using the determination unit 103. When the object in the input image is determined to be the same as any of the objects in the registered image, the output control unit 104 outputs a detection result indicating that an object corresponding to one of the registered objects is present in the input image.

In this manner, the image processing device according to the first embodiment detects two or more partial areas from two images, extracts a feature vector for determining whether the objects are the same from each of the partial areas, and determines whether the objects are the same by using the extracted feature vector. In this manner, it is possible to more accurately determine whether the objects in the two images are the same.

Second Embodiment

An image processing device according to a second embodiment determines whether objects in two images are the same, by estimating attributes of the objects from the images, and by taking the estimated attributes into consideration.

Figure 9:
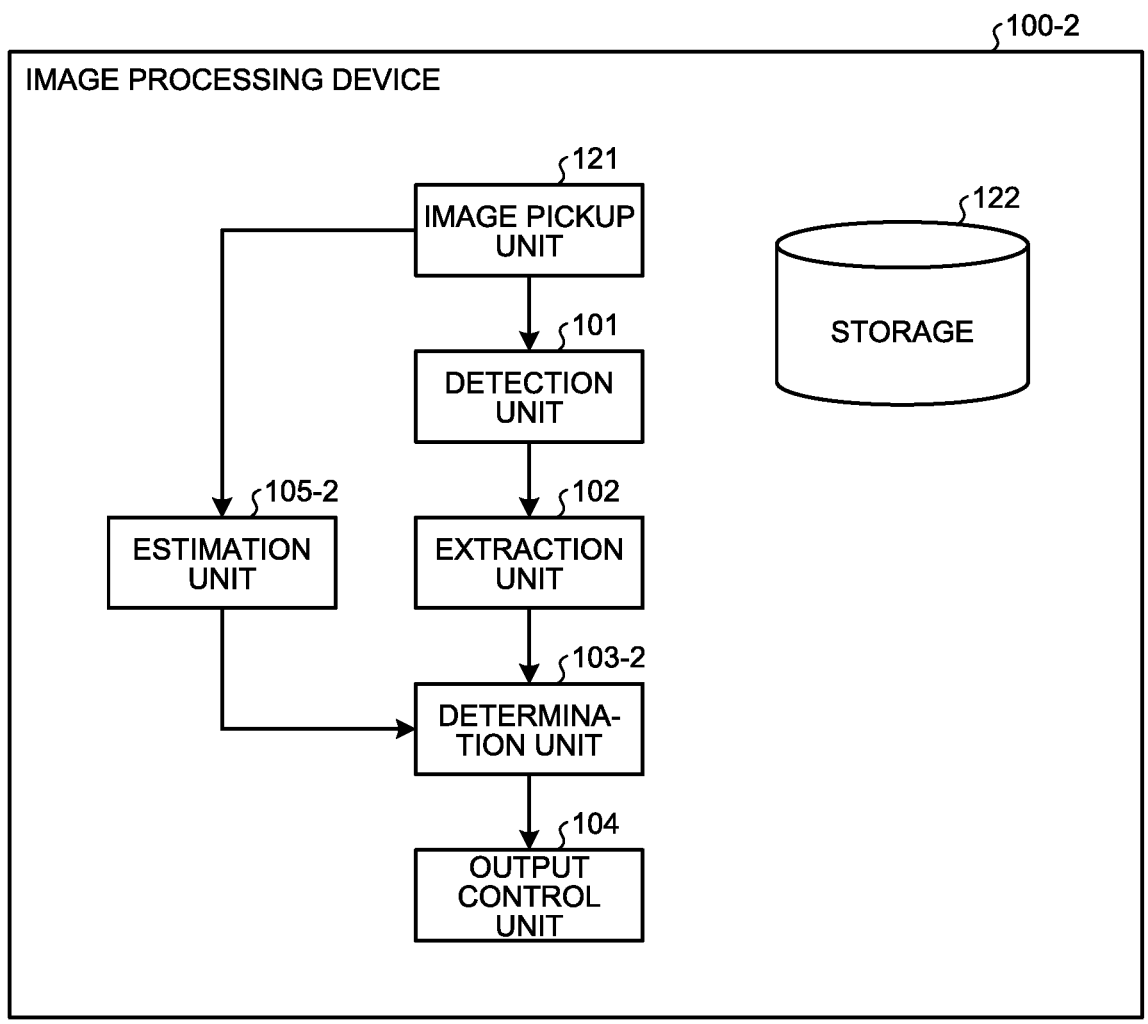
FIG. 9 is a block diagram of an image processing device according to a second embodiment.

FIG. 9 is a block diagram illustrating an example of a configuration of an image processing device 100-2 according to the second embodiment. As illustrated in FIG. 9, the image processing device 100-2 includes the image pickup unit 121, the storage 122, the detection unit 101, the extraction unit 102, a determination unit 103-2, the output control unit 104, and an estimation unit 105-2.

The second embodiment is different from the first embodiment in adding the estimation unit 105-2 and including the determination unit 103-2 having a different function from that of the first embodiment. The other components and functions of the second embodiment are the same as those in FIG. 1 that is the block diagram of the image processing device 100 according to the first embodiment. The same reference numerals denote the same components and description thereof will be omitted here.

The estimation unit 105-2 estimates attribute information indicating attributes of the object from each of the two images. For example, the estimation unit 105-2 estimates attribute information of the object in an area surrounding all the detected partial areas. However, the area from which attribute information is to be estimated is not limited thereto. For example, the estimation unit 105-2 may estimate attribute information from the entire image, or may estimate attribute information from an image corresponding to each of the partial areas.

The attribute information is not information for individually recognizing the object such as the feature vector, but information indicating the category for classifying the object. When the object is a person, for example, the attribute information is age, generation, sex, length of hair, color of hair, color of skin, orientation, type of upper body clothes, color of upper body clothes, type of lower body clothes, color of lower body clothes, type of shoes, color of shoes, type of bag, presence or absence of a bag, color of bag, type of hat, presence or absence of a hat, color of hat, and the like. It is also possible to quantize the colors to the number of colors set in advance. The type, presence or absence, color and the like of the clothing (belongings) other than the clothes, shoes, bag, and hat may also be set as attribute information.

A method of extracting attribution information from an image performed by the estimation unit 105-2 may be any method. For example, the estimation unit 105-2 may estimate attribute information by inputting an image to a learning model that has leaned in advance to output attribute information to an input image.

The determination unit 103-2 determines whether the objects included in two images are the same, by using two pieces of attribute information (first attribute information and second attribute information) that are estimated for each of the two images and the feature vectors extracted from the two images.

For example, the determination unit 103-2 arranges a plurality of pieces of estimated attribute information, and calculates a vector having the same dimensionality as the number of attributes. The determination unit 103-2 calculates the degree of similarity between the two vectors obtained for each of the two images. The degree of similarity between the vectors may be projected onto space in which the same objects become close to each other and different objects become far from each other, by metric learning in advance.

For example, the determination unit 103-2 determines whether the persons are the same, by handling the degree of similarity between the pieces of attribute information similarly to the degree of similarity calculated from the feature vector (feature vector) of the other partial area. The attribute information (vector) may be independently processed from the feature vector, or may be processed as a vector integrated with the feature vector.

Figure 10:
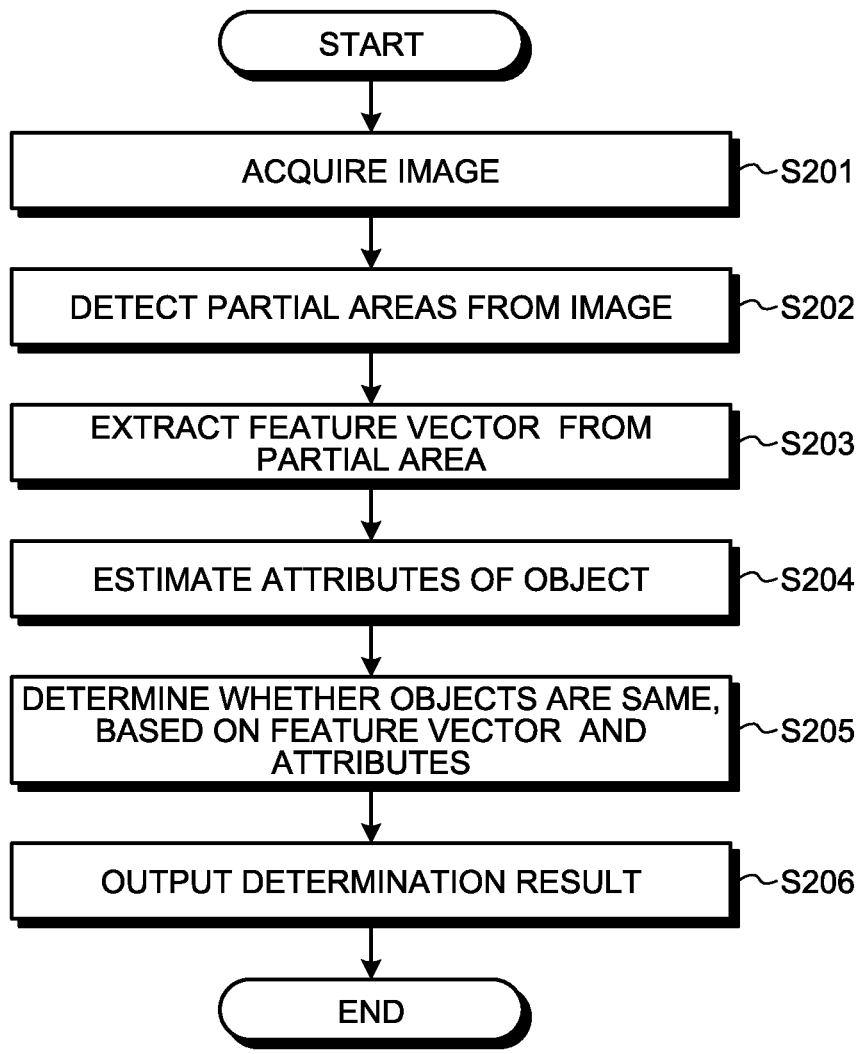
FIG. 10 is a flowchart of a determination process in the second embodiment.

Next, a determination process performed by the image processing device 100-2 according to the second embodiment configured in this manner will be described with reference to FIG. 10. FIG. 10 is a flowchart illustrating an example of a determination process in the second embodiment.

Step S201 to step S203 are the same processes as step S101 to step S103 of the image processing device 100 according to the first embodiment. Consequently, description thereof will be omitted.

The estimation unit 105-2 estimates attribute information indicating attributes of an object from the acquired image (step S204). The determination unit 103-2 determines whether the objects in the two images are the same, by using the attribute information in addition to the feature vector (step S205). Step S206 is the same process as step S105 of the image processing device 100 according to the first embodiment. Consequently, description thereof will be omitted.

Figure 11:
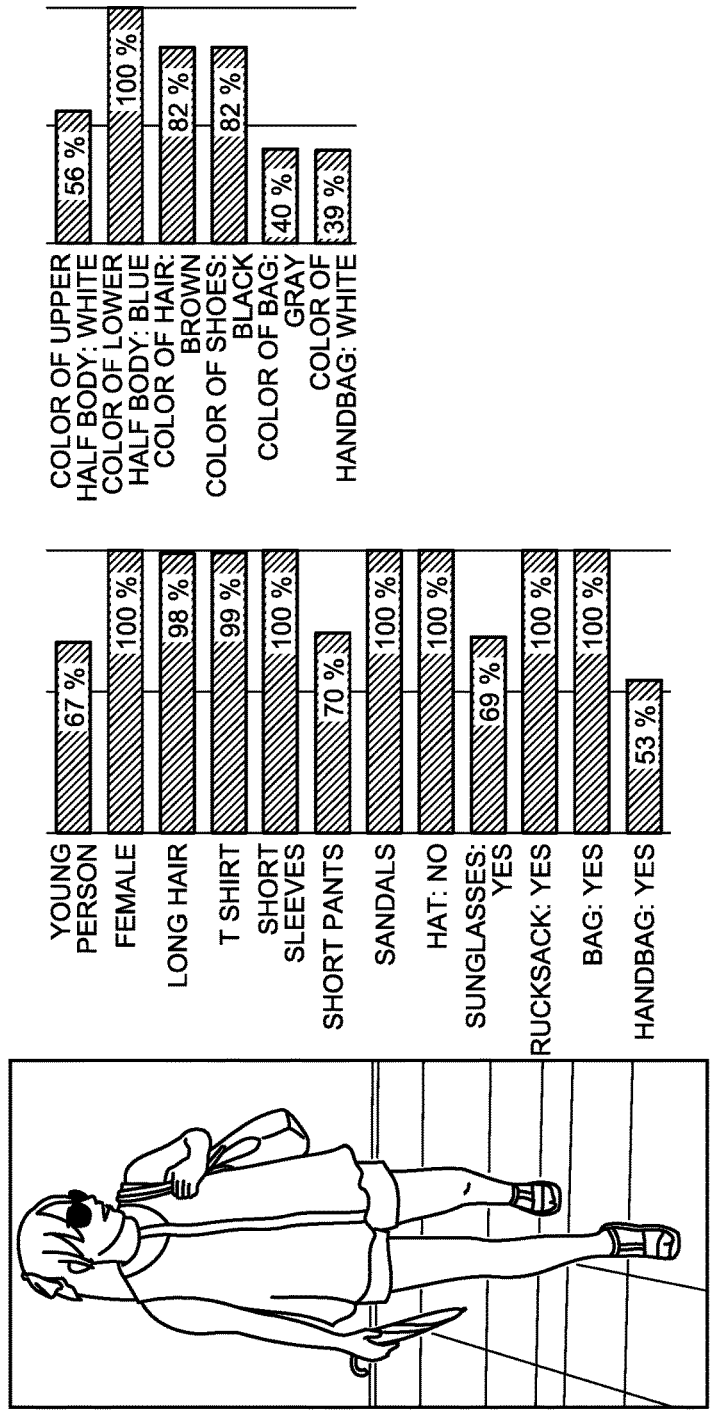
FIG. 11 is a diagram illustrating a specific example of attribute information.
Figure 12:
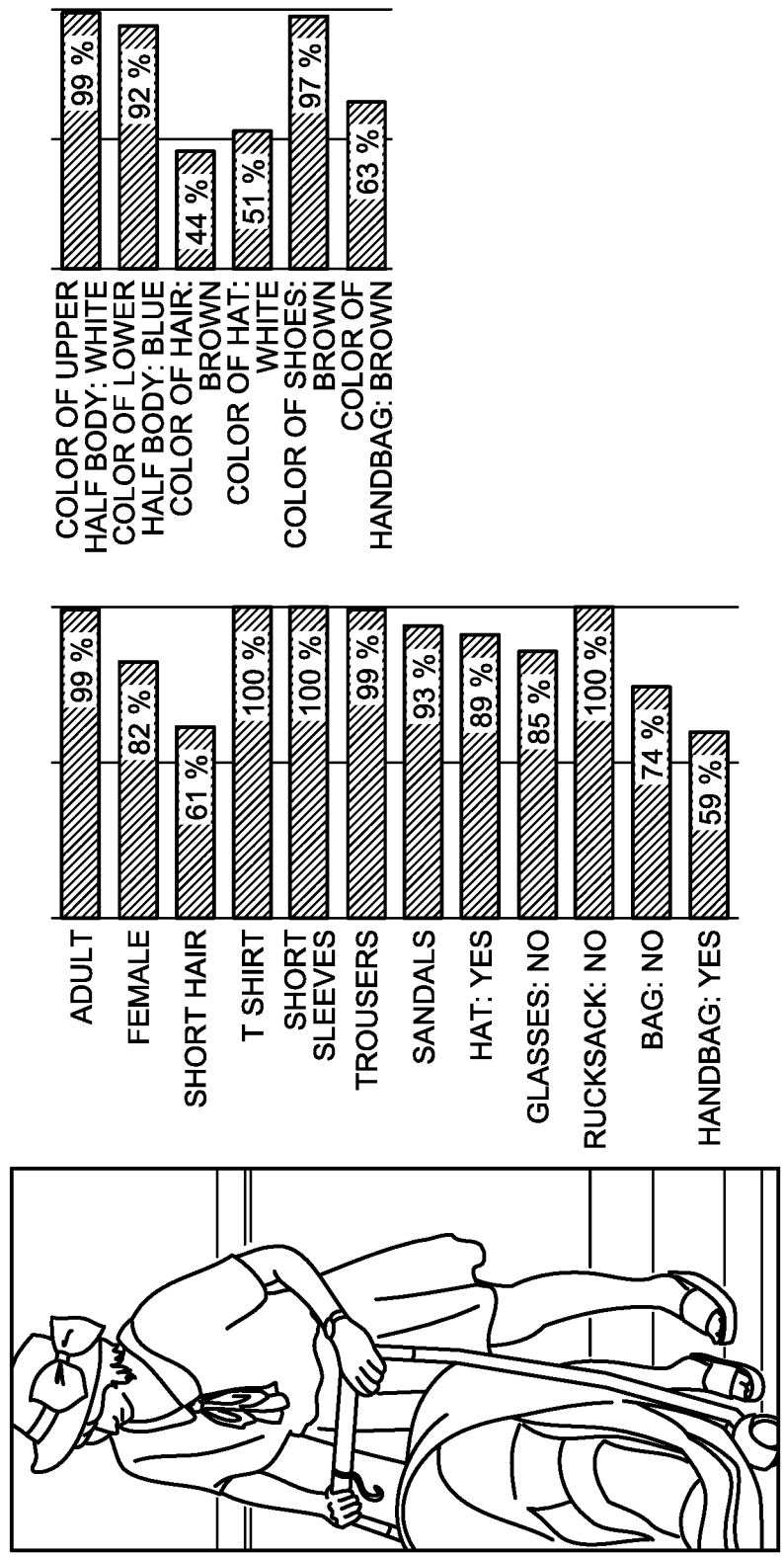
FIG. 12 is a diagram illustrating a specific example of attribute information.

Next, a specific example of the attribute information will be described. FIG. 11 and FIG. 12 are diagrams each illustrating a specific example of attribute information. FIG. 11 and FIG. 12 are examples in which an object to be determined is a person, and the following pieces of attribute information are used.

generation (young person, adult, and the like) sex (female, male, and the like)
length of hair (long hair, short hair, and the like) type of upper body clothes (T shirt, short sleeves, and the like)
type of lower body clothes (short pants, trousers, and the like)
type of shoes (sandals and the like)
presence or absence of a hat
presence or absence of sunglasses
presence or absence of glasses
presence or absence of a rucksack
presence or absence of a bag
presence or absence of a handbag
color of the upper half body
color of the lower half body
color of hair
color of shoes
color of bag
color of handbag A certainty factor of estimation is associated with each attribute information. The determination unit 103-2 may also determine the degree of similarity of attribute information by taking the certainty factor into consideration. For example, the determination unit 103-2 may determine the degree of similarity by only using the attribute information in which the certainty factor is equal to or more than a threshold.

The determination unit 103-2 determines the identity of objects by using at least one piece of the attribute information in addition to the feature vector. Consequently, it is possible to improve the determination accuracy as compared with when only the feature vector is used. For example, even when the feature vectors are similar but the degree of similarity of the attribute information is low, it is possible to determine that the objects in the two images are different.

In this manner, with the image processing device according to the second embodiment, it is possible to more accurately determine whether the objects are the same, by taking the attributes of the objects estimated from the images into consideration.

As described above, with the first and the second embodiments, it is possible to more accurately determine whether the objects in the images are the same.

Figure 13:
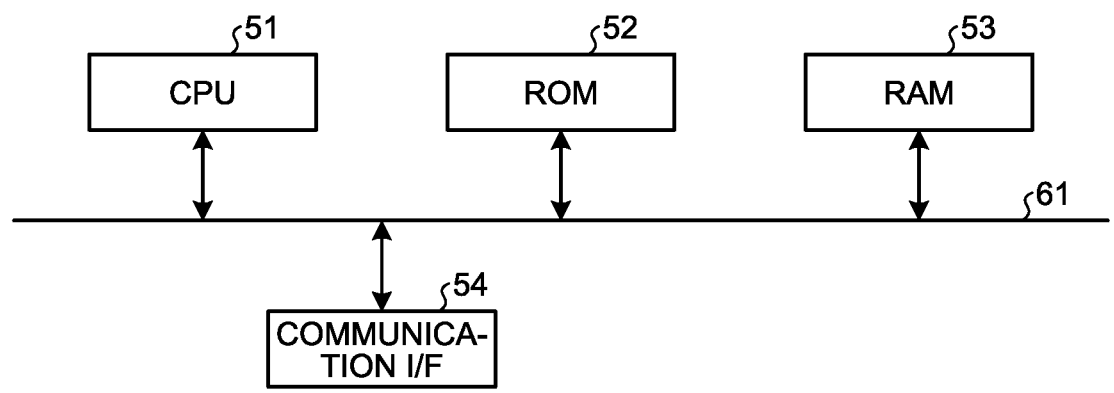
FIG. 13 is a hardware configuration diagram of a device according to the first or the second embodiment.

Next, a hardware configuration of the device (image processing device, terminal device) according to the first or the second embodiment will be described with reference to FIG. 13. FIG. 13 is an explanatory diagram illustrating an example of a hardware configuration of a device according to the first or the second embodiment.

The device according to the first or the second embodiment includes a control device such as a central processing unit (CPU) 51, a storage device such as a read only memory (ROM) 52, and a random access memory (RAM) 53, a communication interface (I/F) 54 for performing communication by connecting to a network, and a bus 61 connecting the units.

A computer program to be executed by the device according to the first or the second embodiment is provided by being incorporated into the ROM 52 and the like in advance.

The computer program to be executed by the device according to the first or the second embodiment may also be provided as a computer program product by being stored in a computer readable storage media such as a compact disc read-only memory (CD-ROM), a flexible disk (FD), a compact disc-recordable (CD-R), and a digital versatile disc (DVD) in an installable or executable file format.

Moreover, the computer program to be executed by the device according to the first or the second embodiment may be stored in a computer connected to a network such as the Internet, and provided by being downloaded through the network. The computer program to be executed by the device according to the first or the second embodiment may also be provided or distributed via a network such as the Internet.

The computer program to be executed by the device according to the first or the second embodiment can cause a computer to function as the units described above. The computer can cause the CPU 51 to read out a computer program from a computer readable storage medium to the main storage device to execute the computer program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing device, comprising:
one or more processors configured to:
detect two or more first partial areas corresponding to each of two or more portions among a first plurality of portions of a first image, the first plurality of portions included in a first object, and detect two or more second partial areas corresponding to each of two or more portions among a second plurality of portions of a second image;
extract two or more first feature vectors from two or more areas of the first partial areas, and extract two or more second feature vectors from two or more areas of the second partial areas; and
determine whether the first object included in the first image and a second object included in the second image are the same, by using the first feature vectors and the second feature vectors, wherein
the one or more processors determines whether the first object included in the first image and the second object included in the second image are the same, by using a third feature vector from the two or more first feature vectors extracted from a third partial area of the two or more first partial areas, and a fourth feature vector from the two or more second feature vectors extracted from a fourth partial area of the two or more second partial areas, the fourth partial area corresponds to the third partial area.

2. The image processing device according to claim 1, wherein the one or more processors determines whether the object included in the first image and the object included in the second image are the same, by calculating a degree of similarity between the third feature vector and the fourth feature vector for each of the first plurality of portions and the second plurality of portions, and by using a value obtained by weighting the degree of similarity using a weight set for each of the first plurality of portions and the second plurality of portions.

3. The image processing device according to claim 2, wherein the weight is set according to reliability in determining whether objects are the same.

4. The image processing device according to claim 1, wherein the one or more processors determines whether the object included in the first image and the object included in the second image are the same, by using a feature vector obtained by weighting two or more feature vectors of the first feature vectors using a weight set for each of the first plurality of portions and the second plurality of portions and a feature vector obtained by weighting two or more feature vectors of the second feature vectors using the weight.

5. The image processing device according to claim 4, wherein the weight is set according to reliability in determining whether objects are the same.

6. The image processing device according to claim 1, wherein
the object is a person, and
the first plurality of portions and the second plurality of portions comprise two or more of face, head, whole body, upper half body, lower half body, torso, arm, leg, or foot.

7. The image processing device according to claim 1, wherein:
the one or more processors further configured to estimate first attribute information indicating an attribute of the first object from the first image, and estimate second attribute information indicating an attribute of the second object from the second image,
the one or more processors determines whether the first object included in the first image and the second object included in the second image are the same, by using the first attribute information, the second attribute information, the first feature vectors, and the second feature vectors.

8. An image processing method, comprising:
- detecting two or more first partial areas corresponding to each of two or more portions among a first plurality of portions of a first image, the first plurality of portions included in a first object, and detecting two or more second partial areas corresponding to each of two or more portions among a second plurality of portions of a second image;
- extracting two or more first feature vectors from two or more areas of the first partial areas, and extracting two or more second feature vectors from two or more areas of the second partial areas; and
- determining whether the first object included in the first image and a second object included in the second image are the same, by using the first feature vectors and the second feature vectors, wherein
- the determining includes determining whether the first object included in the first image and the second object included in the second image are the same, by using a third feature vector from the two or more first feature vectors extracted from a third partial area of the two or more first partial areas, and a fourth feature vector from the two or more second feature vectors extracted from a fourth partial area of the two or more second partial areas, the fourth partial area corresponds to the third partial area.

9. A computer program product having a non-transitory computer readable medium comprising instructions programmed therein, wherein the instructions, when executed by a computer, cause the computer to perform:
- detecting two or more first partial areas corresponding to each of two or more portions among a first plurality of portions of a first image, the first plurality of portions included in a first object, and detecting two or more second partial areas corresponding to each of two or more portions among a second plurality of portions of a second image;
- extracting two or more first feature vectors from two or more areas of the first partial areas, and that extracts two or more second feature vectors from two or more areas of the second partial areas; and
- determining whether the first object included in the first image and a second object included in the second image are same, by using the first feature vectors and the second feature vectors, wherein
- the determining includes determining whether the first object included in the first image and the second object included in the second image are the same, by using a third feature vector from the two or more first feature vectors extracted from a third partial area of the two or more first partial areas, and a fourth feature vector from the two or more second feature vectors extracted from a fourth partial area of the two or more second partial areas, the fourth partial area corresponds to the third partial area.

* * * * *